(12) United States Patent
Mosko

(10) Patent No.: US 10,009,446 B2
(45) Date of Patent: Jun. 26, 2018

(54) HEADER COMPRESSION FOR CCN MESSAGES USING DICTIONARY LEARNING

(71) Applicant: CISCO TECHNOLOGY, INC., San Jose, CA (US)

(72) Inventor: Marc E. Mosko, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 193 days.

(21) Appl. No.: 14/929,994

(22) Filed: Nov. 2, 2015

(65) Prior Publication Data

US 2017/0126850 A1     May 4, 2017

(51) Int. Cl.
| | | |
|---|---|---|
| H04L 12/741 | (2013.01) |
| H04L 12/54 | (2013.01) |
| H04L 29/06 | (2006.01) |
| H04L 5/00 | (2006.01) |

(52) U.S. Cl.
CPC ............ *H04L 69/22* (2013.01); *H04L 5/0055* (2013.01); *H04L 45/74* (2013.01); *H04L 69/04* (2013.01)

(58) Field of Classification Search
None
See application file for complete search history.

(56) References Cited

U.S. PATENT DOCUMENTS

| | | |
|---|---|---|
| 817,441 A | 4/1906 | Niesz |
| 4,309,569 A | 1/1982 | Merkle |
| 4,921,898 A | 5/1990 | Lenney |
| 5,070,134 A | 12/1991 | Oyamada |
| 5,110,856 A | 5/1992 | Oyamada |
| 5,506,844 A | 4/1996 | Rao |
| 5,629,370 A | 5/1997 | Freidzon |
| 5,870,605 A | 2/1999 | Bracho |
| 6,052,683 A | 4/2000 | Irwin |
| 6,091,724 A | 7/2000 | Chandra |

(Continued)

FOREIGN PATENT DOCUMENTS

| | | |
|---|---|---|
| DE | 1720277 A1 | 6/1967 |
| DE | 19620817 A1 | 11/1997 |

(Continued)

OTHER PUBLICATIONS

Extended European Search Report in corresponding European application No. 16194915.1, dated Mar. 10, 2017, 9 pages.

(Continued)

*Primary Examiner* — Alpus H Hsu
*Assistant Examiner* — Camquyen Thai

(57) ABSTRACT

One embodiment provides a system in a first node that facilitates efficient packet forwarding. During operation, the system identifies a type, length, and value (TLV) string in a packet and, in response, generates a compressed representation of the TLV string. The system stores the compressed representation for the TLV string in an entry of a learned dictionary in a storage device of the first node. The system then sends the entry to a second node and, in response, receives an acknowledgement from the second node. If the system identifies the TLV string in a subsequent second packet of the acknowledgement, the system compresses the TLV string in the second packet based on the compressed representation.

20 Claims, 13 Drawing Sheets

(56) References Cited

U.S. PATENT DOCUMENTS

| | | |
|---|---|---|
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,903,756 B2 | 12/2014 | Zhao |
| 8,937,865 B1 | 1/2015 | Kumar |
| 9,071,498 B2 | 6/2015 | Beser |
| 9,112,895 B1 | 8/2015 | Lin |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Peterka |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |

(56) References Cited

U.S. PATENT DOCUMENTS

| | | |
|---|---|---|
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Lovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246439 A1 | 9/2010 | Heath et al. |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | Vanderlinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0122893 A1* | 5/2011 | Kang ............... H04L 69/04 370/477 |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |

(56) References Cited

U.S. PATENT DOCUMENTS

| | | |
|---|---|---|
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0243001 A1 | 9/2013 | Byun et al. |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

H. Hannu, et al., "Signaling Compression (SigComp)—Extended Operations", Network Working Group, Jan. 2003, RFC 3321, 18 pages.
Wikipedia page, "Type-length-value", https://en.wikipedia.org/wiki/Type-lenght-value, last accessed Feb. 7, 2018, 3 pages.
Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
"PBC Library-Pairing-Based Cryptography-About," http://crypto.stanford.edu/pbc. downloaded Apr. 27, 2015.
C. Gentry and A. Silverberg. Hierarchical ID-Based Cryptography. Advances in Cryptology—ASIACRYPT 2002. Springer Berlin Heidelberg (2002).
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).
Anteniese et al., "Improved Proxy Re-Encryption Schemes with Applications to Secure Distributed Storage", 2006.
Xiong et al., "CloudSeal: End-to-End Content Protection in Cloud-based Storage and Delivery Services", 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Lotspiech, S. Nusser, and F. Pestoni. Anonymous Trust: Digit.
J. Shao and Z. Cao. CCA-Secure Proxy Re-Encryption without Pairings. Public Key Cryptography. Springer Lecture Notes in Computer Sciencevol. 5443 (2009).
Gopal et al. "Integrating content-based Mechanisms with hierarchical File systems", Feb. 1999, University of Arizona, 15 pages.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009). Available online at http://wwwimages.adobe.com/www.adobe.com/content/dam/Adobe/en/devnet/rtmp/ pdf/rtmp specification 1.0.pdf.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Mini-conference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE Infocom 2012 (2012).

(56) References Cited

OTHER PUBLICATIONS

Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' Infocom 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.

Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the

(56) References Cited

OTHER PUBLICATIONS

Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Hur, "Improving security and efficiency in attribute-based data sharing," IEEE Trans. Knowledge Data Eng., vol. 25, No. 10, pp. 2271-2282, Oct. 2013.
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.

Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.

(56) References Cited

OTHER PUBLICATIONS

Sun, Ying, and Daniel S. Weld. "A framework for model-based repair." AAAI. 1993.
T. Ballardie, P. Francis, and J. Crowcroft, "Core Based Trees (CBT)," Proc. ACM Sigcomm '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al.,"DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.

Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.

* cited by examiner

HEADER COMPRESSION FOR CCN MESSAGES USING DICTIONARY LEARNING

RELATED APPLICATION

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");

U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175"); and U.S. patent application Ser. No. 14/065,691, entitled "SYSTEM AND METHOD FOR HASH-BASED FORWARDING OF PACKETS WITH HIERARCHICALLY STRUCTURED VARIABLE-LENGTH IDENTIFIERS," by inventors Marc E. Mosko and Michael F. Plass, filed 29 Oct. 2013 (hereinafter "U.S. patent application Ser. No. 14/065,691"); and the disclosures of which are herein incorporated by reference in their entirety.

BACKGROUND

Field

This disclosure is generally related to distribution of digital content. More specifically, this disclosure is related to header compression of a CCN message.

Related Art

The proliferation of the Internet and e-commerce continues to create a vast amount of digital content. Content-centric network (CCN) architectures have been designed to facilitate accessing and processing such digital content. A CCN includes entities, or nodes, such as network clients, forwarders (e.g., routers), and content producers, which communicate with each other by sending "interest" packets for various content items and receiving "content object" packets in return. CCN interests and content objects are identified by their unique names, which are typically hierarchically structured variable length identifiers (HSVLI). An HSVLI can include contiguous name components ordered from a most general level to a most specific level.

A CCN message (e.g., a message from a CCN node) may include a number of repeated fields in its header. In addition to actual values of different fields, the header may carry field information (e.g., type and length) associated with the fields. For example, different name components of an HSVLI can have different values as well their corresponding types and lengths. However, since each component of the HSVLI can be of type "name," the same field information is repeated. As a result, the information in the header of a CCN message can become repetitious and lead to inefficient resource utilization while forwarding the packets.

SUMMARY

One embodiment provides a system in a first node that facilitates efficient packet forwarding. During operation, the system identifies a type, length, and value (TLV) string in a packet and, in response, generates a compressed representation of the TLV string. The system stores the compressed representation for the TLV string in an entry of a learned dictionary in a storage device of the first node. The system then sends the entry to a second node and, in response, receives an acknowledgement from the second node. If the system identifies the TLV string in a subsequent second packet of the acknowledgement, the system compresses the TLV string in the second packet based on the compressed representation.

In a variation on this embodiment, the compressed representation in the entry is a compressed replacement string. This compressed replacement string is mapped to the TLV string in the entry. The system then compresses the TLV string in the second packet by replacing the TLV string with the compressed replacement string.

In a further variation, a length of the compressed replacement string is proportional to a length of the TLV string in the entry.

In a variation on this embodiment, the compressed representation in the entry is a compressed counter comprising a compressor key. This compressor key is mapped to a type of the TLV string and a base value. The system then compresses the TLV string in the second packet by calculating an offset based on a value in the TLV string and the base value, and replacing the TLV string with the compressor key and the offset.

In a variation on this embodiment, the packet is a content-centric network (CCN) message. A name for the CCN message is a hierarchically structured variable length identifier (HSVLI), which comprises contiguous name components ordered from a most general level to a most specific level. The system then replaces a fixed header of the CCN message with a compressed fixed header.

In a further variation, the TLV string is one of: (i) a Key Identifier; (ii) a Public Key; (iii) a Certificate; and (iv) a Name Prefix.

In a variation on this embodiment, the first and second nodes store a static dictionary. The static dictionary maps a type and length (TL) string to a compressed replacement string. One or more TL strings of the acknowledgement from the second node is then compressed based on the static dictionary.

In a variation on this embodiment, the entry is timed out in response to inactivity over a period of time.

In a variation on this embodiment, the TLV string in the packet is a concatenation of a plurality of TLV strings.

BRIEF DESCRIPTION OF THE FIGURES

In the figures, like reference numerals refer to the same figure elements.

DETAILED DESCRIPTION

Figure 1A:
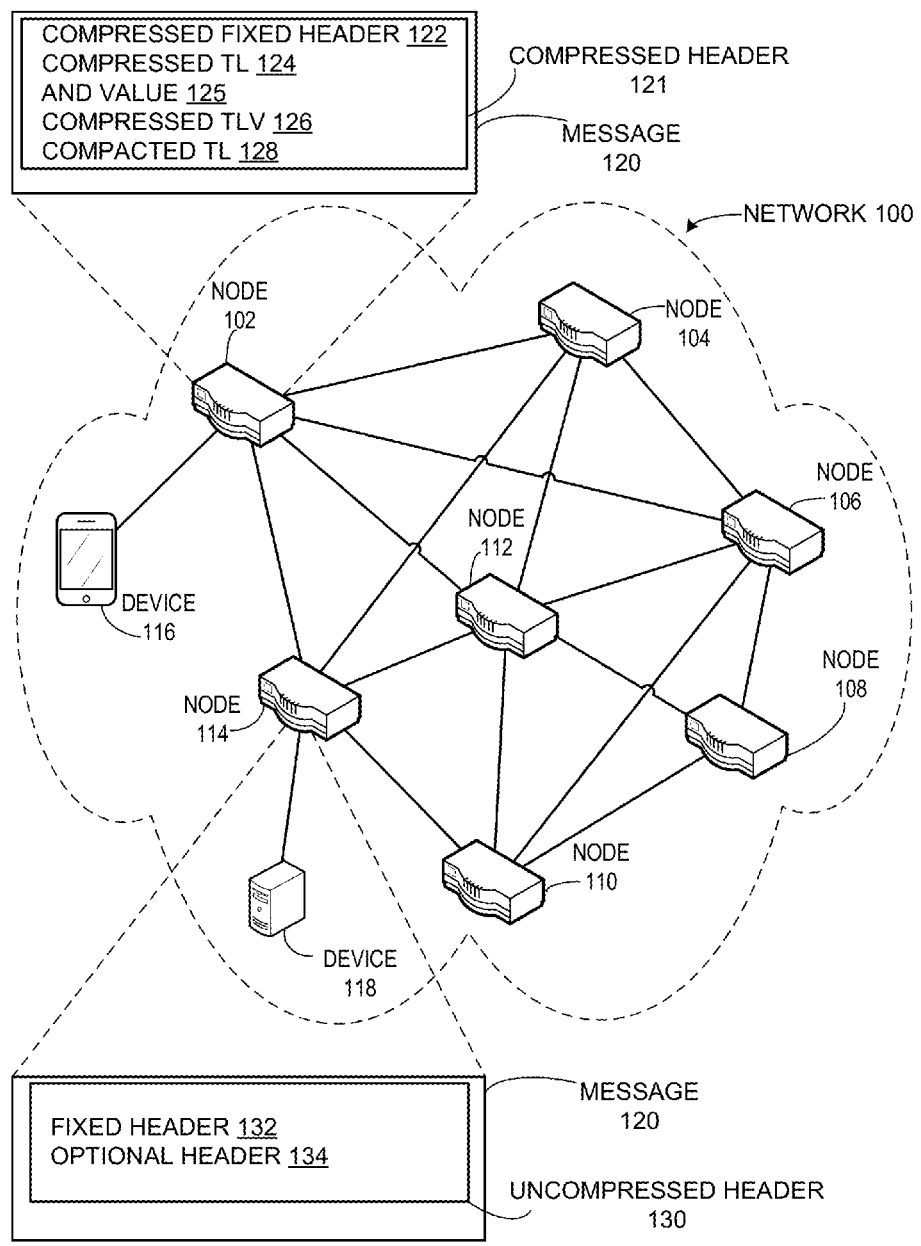
FIG. 1A illustrates an exemplary content-centric network (CCN) that facilitates header compression for messages, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system which facilitates header compression for a content-centric networking (CCN) message (also referred to as a CCN packet), such as an interest message, transmitted over a network. A CCN message includes a fixed header, zero or more optional header fields, and a plurality of message body fields. The fixed header includes a number of fields, which are typically over-provisioned in terms of bit length for most of the packets. Furthermore, the header and body fields are represented by a type, length, and value (TLV) format. Some of the of the TLV fields can include contiguous TL pairs without an intermediate value. This can lead to highly predictable information (e.g., a repeated type and length) in the header of the CCN message.

To solve this problem, embodiments of the presented invention compresses the fixed header using compressed fixed header formats and the TLV fields using static, learned, and/or encoded dictionaries. A CCN node maintains one or more compressed fixed header formats for compressing the fixed headers. The node also maintains a static dictionary, which can be predefined, for compressing TL pairs. The node can also learn TLV strings, generate a corresponding compressed replacement string, and maintain a mapping between them in an entry of a learned dictionary. The node shares this entry of the learned dictionary with a peer node, thereby allowing the node to compress the learned TLV string in the header of a subsequent message to the peer node. In some embodiments, the node can further encode the static dictionary by applying an encoding technique (e.g., Huffman encoding) to improve compression efficiency.

During operation, before transmitting a message to a peer, the node compresses the fixed header based on one of the compressed fixed header formats. The node then parses the header and message fields to obtain the TL pair strings, obtains respective compressed replacement strings (CRSs) matching the TL pair strings from the static dictionary, and replaces the TL pair strings with the corresponding replacement strings. In some embodiments, the node can look up the TL pair strings in the encoded dictionary instead of the static dictionary. In some further embodiments, the node can also parse the header and message fields to obtain the TLV strings, obtain respective compressed replacement strings matching the TLV strings from the learned dictionary, and replace the TLV strings with the corresponding compressed replacement strings. If a TL pair does not trigger a match in any of the dictionaries, the node can still reduce the length of the TL pair by using a compact representation of the TL pair in smaller bit fields. Using one or more of these techniques, the node compresses the header of a CCN message.

In this disclosure, the term "header compression" is used in the common usage of reducing the amount of framing and signaling overhead in a packet, excluding application payload. In a CCN message, header compression applies to the packet framing (fixed header), field framing (type-length-value), and signaling such as cryptographic keys or hash values that are part of the CCN protocol.

The following terms are used to describe the CCN architecture:

Content Object: A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814.

A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175.

Exemplary Network and Communication

FIG. 1A illustrates an exemplary content-centric network (CCN) that facilitates header compression for messages, in accordance with an embodiment of the present invention. A network 100, which can be a CCN, can include a client device 116, a content producing device 118, and a router or other forwarding device at nodes 102, 104, 106, 108, 110, 112, and 114. A node can be a computer system, an end-point representing users, and/or a device that can generate interests or originate content. Suppose that peer CCN nodes 102 and 114 shares a static dictionary, a learned dictionary, and an encoded dictionary. Nodes 102 and 114 can also be aware of compressed fixed header formats supported by each other. In some embodiments, the static dictionary is pre-configured (e.g., by a network administrator) and propagated through network 100.

During operation, CCN node 102 can generate a message 120 (e.g., an interest for a piece of content). Message 120 includes a fixed header, an optional header, and a CCN message payload. Node 102 can compress the header and message fields of message 120 to generate a compressed header 121. Compressed header 121 can include one or more of: a compressed fixed header 122 generated based on the compressed fixed header formats, a compressed TL pair 124 based on the static (and/or encoded dictionary) and a corresponding value 125 of the TL pair, a compressed TLV 126 based on the learned dictionary, and a compacted TL pair 128, which has not matched an entry in a dictionary. In some embodiments, node 102 includes a context identifier in compressed header 121. The context identifier can indicate which dictionaries have been used to generate compressed header 121.

Node 102 transmits message 120 to peer CCN node 114. Node 114 receives message 120, obtains the context identifier from compressed header 121, and obtains dictionary information from the context identifier. Node 114 then obtains information from the header fields of compressed fixed header 122 based on its format. Node 114 then performs a reverse lookup (i.e., a reverse matching) in the static (and/or encoded) dictionary for the compressed TL pair 124 and obtains the original TL pair, and uses value 125 in the context of that TL pair. In the same way, node 114 obtains the original TLV from compressed TLV 126 based on the shared learned dictionary. Node 114 also obtains information from the fields of compacted TL pair 128 based on its format. Node 114, thus, generates an uncompressed header 130, which includes fixed header 132 and optional header 134, generated based on the reverse dictionary lookup. In this way, peer nodes 102 and 114 can exchange a CCN message with compressed header, thereby achieving efficiency in transmission and header processing.

Header Compression Overview

Figure 1B:
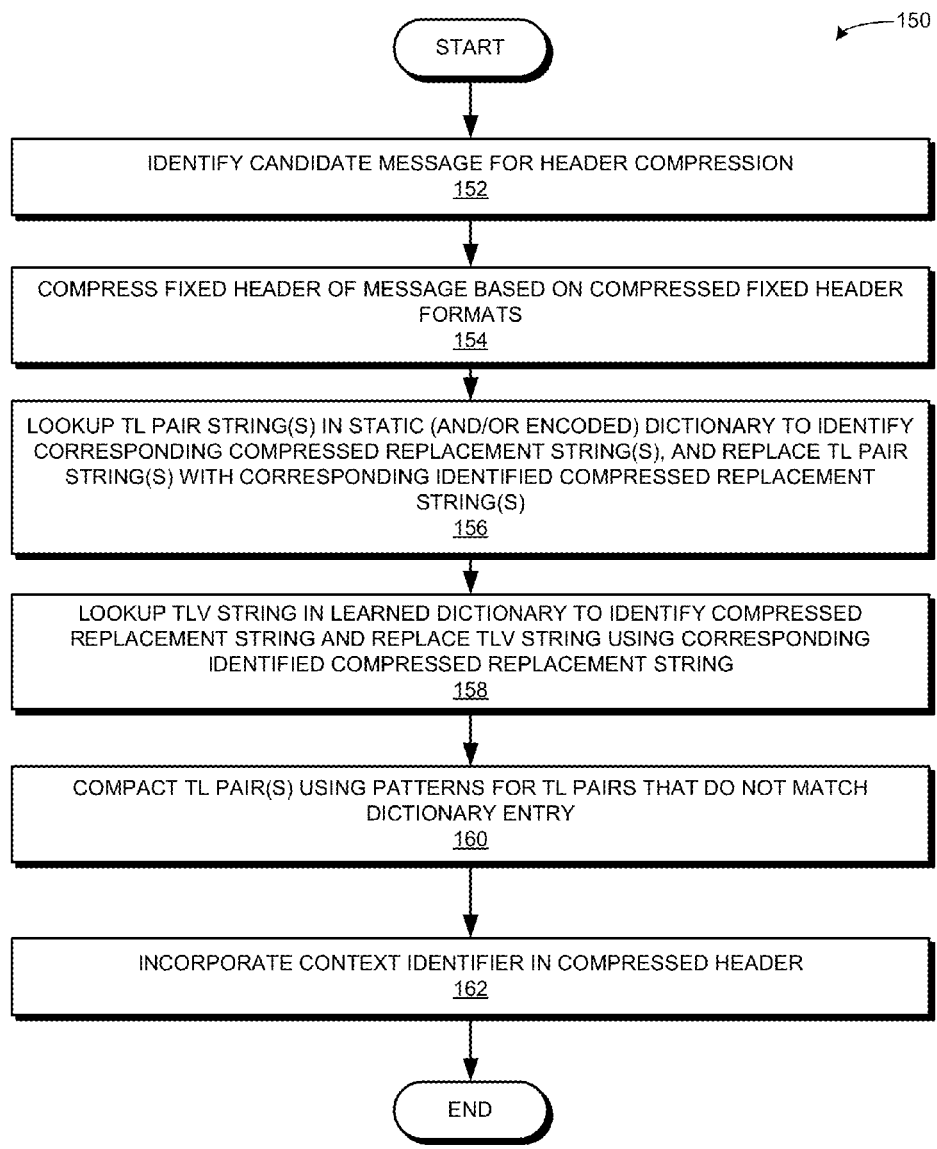
FIG. 1B presents a flow chart illustrating a method for compressing headers of a CCN message, in accordance with an embodiment of the present invention.

FIG. 1B presents a flow chart 150 illustrating a method for compressing headers of a CCN message, in accordance with an embodiment of the present invention. During operation, a header compression system of a CCN node identifies a candidate message for header compression (operation 152). Example of the candidate message include, but are not limited to, an uncompressed message received from another CCN node, a message whose header the CCN node has uncompressed, and a message generated by the CCN node. The system then compresses the fixed header of the message based on the compressed fixed header formats (operation 154). The formats represent the most common values for different fields of a fixed header in an efficient way.

The system looks up TL pair string(s) from the optional header and message body of the message in the static dictionary to identify the corresponding compressed replacement string(s). The system then replaces the TL pair string(s) with the identified compressed replacement string(s) (operation 156). In some embodiments, the system can perform the lookup in an encoded dictionary, which is generated by encoding the static dictionary (e.g., by applying Huffman encoding). If the encoded replacement strings are of variable length, encoded replacement strings is preceded by an encoded length of the TL pair string(s). The system then looks up TLV string(s) from the optional header and message body of the message in the learned dictionary to identify the corresponding compressed replacement string(s). The system then replaces the TLV string(s) with the identified compressed replacement string(s) (operation 158).

If any TL pair does not match a dictionary entry, the system may still reduce the size of the TL pair. The system then compacts the TL pair by using patterns for the TL pair(s) that do not match a dictionary entry (operation 160). In some embodiments, the system incorporates a context identifier in the compressed header (operation 162). This context identifier can precede the compressed fixed header and identify one or more dictionaries used to generate the compressed header. For example, if the peer nodes have a plurality of static dictionaries, the peer node receiving the message with the compressed header can determine which dictionary to use to decompress the compressed header from the context identifier.

Fixed Header Compression

Figure 2A:
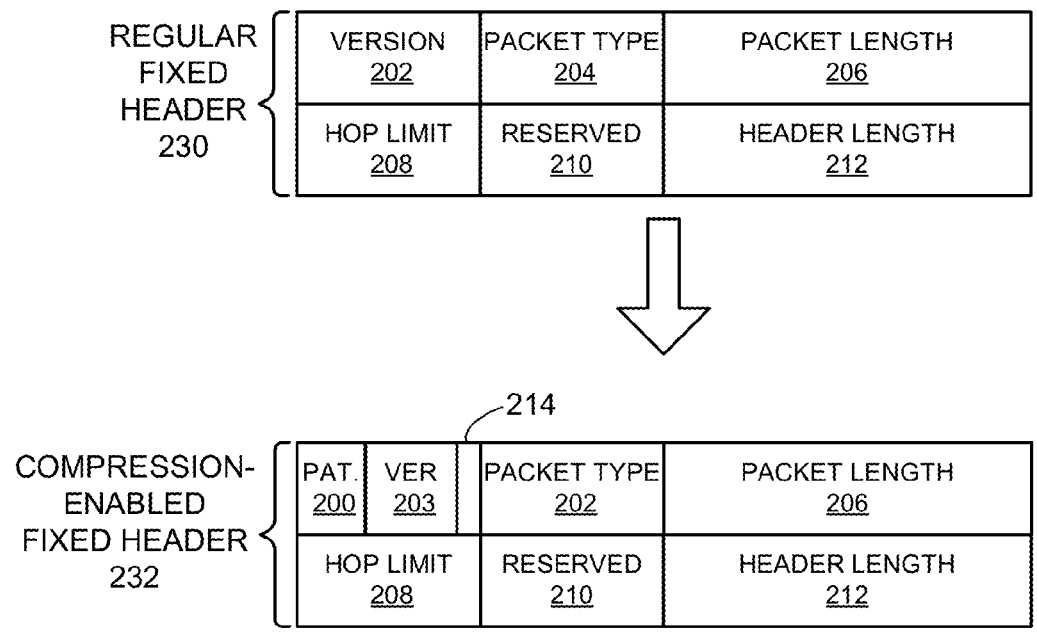
FIG. 2A illustrates an exemplary compression-enabled fixed header of a CCN message, in accordance with an embodiment of the present invention.

FIG. 2A illustrates an exemplary compression-enabled fixed header of a CCN message, in accordance with an embodiment of the present invention. A regular fixed header 230 of the CCN message typically includes a plurality of fields. These fields include one or more of: version 202, packet type 204, packet length 206, hop limit 208, and header length 212. In addition, fixed header 230 can also include reserved field 210. However, when a node receives a packet with fixed header 230, the node may not recognize whether the header (i.e., the fixed and/or optional header) of packet is compressed.

To solve this problem, the format of fixed header 230 is changed to compression-enabled fixed header 232. The bits of version field 202 is redistributed to include a pattern field 200 (i.e., a bit pattern), a shorter version field 203, and a reserve bit 214. Pattern field 200 can indicate whether a packet is compressed. Pattern field 200 can also indicate which fixed header format is used to generate a compressed fixed header. For example, a pattern "000" can indicate that the packet is uncompressed, and a pattern "001" can indicate a specific compressed fixed header format.

Figure 2B:
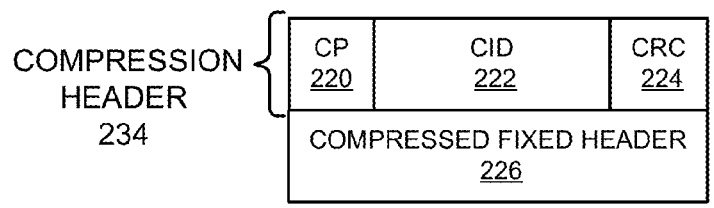
FIG. 2B illustrates an exemplary compression header of a CCN message, in accordance with an embodiment of the present invention.

FIG. 2B illustrates an exemplary compression header of a CCN message, in accordance with an embodiment of the present invention. A compression header 234 is prepended before a compressed fixed header 226. It should be noted that compressed fixed header 226 may have the same field lengths as fixed header 232. However, the pattern of compressed fixed header 226 still identifies it as a compressed header if the following optional header is compressed. In this way, a peer node is aware of a compressed optional header.

Compression header 234 includes a context pattern 220, a context identifier 222, and a cyclic redundancy check (CRC) field 224. In some embodiments, CRC field 224 is computed based on a RObust Header Compression (ROHC), as discussed in IETF Request for Comments (RFC) 4995, titled "The RObust Header Compression (ROHC) Framework," available at http://tools.ietf.org/html/rfc4995, which is incorporated by reference herein. Context identifier 222 can have different lengths (e.g., 3 bits or 10 bits for byte alignment). Context pattern 220 indicates the length of the context identifier.

Figure 2C:
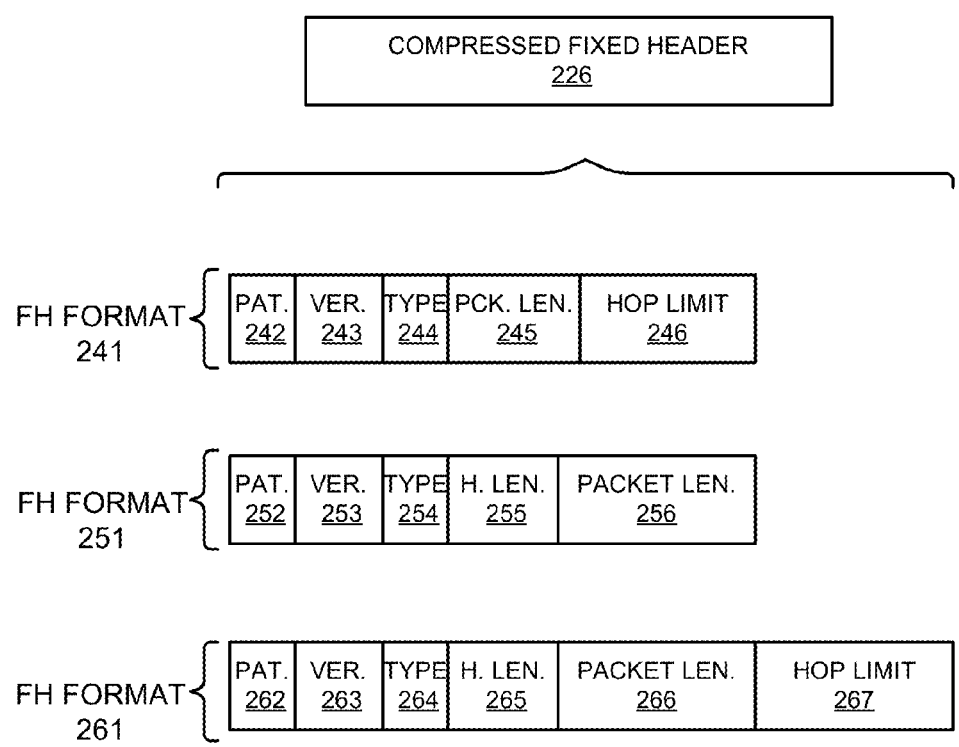
FIG. 2C illustrates exemplary compressed fixed header formats for a CCN message, in accordance with an embodiment of the present invention.

FIG. 2C illustrates exemplary compressed fixed header formats for a CCN message, in accordance with an embodiment of the present invention. In this example, compressed fixed header can be represented in format 241, 251, or 261. Each of these formats can be byte-aligned for efficient processing. Format 241 includes a pattern 242 (e.g., "010") identifying format 241, a version field 243, a packet type field 244, a packet length field 245, and a hop limit field 246. Format 241 is suitable if the header has a fixed header length and does not need dedicated bits to represent it. Format 251 includes a pattern 252 (e.g., "011") identifying format 251, a version field 253, a packet type field 254, a header length field 255, and a packet length field 256. Format 251 is suitable if a message does not have a hop limit.

Format 261 includes pattern 262 (e.g., "001" or "100") identifying format 261, a version field 263, a packet type field 264, a header length field 265, a packet length field 266, and a hop limit field 267. Format 261 is suitable if a respective field of a fixed header is needed. However, the field lengths for format 261 can be different, and pattern 262 can indicate the difference in the field lengths. For example, if compressed fixed header 226 needs the same field lengths as fixed header 232, pattern 262 can assume one bit pattern (e.g., "001"). On the other hand, if the field lengths are shorter than fixed header 232, pattern 262 can assume another bit pattern (e.g., "100"). The fields in format 261 can remain the same, or the header length field can be further divided to represent a return code in addition to the header length.

Figure 2D:
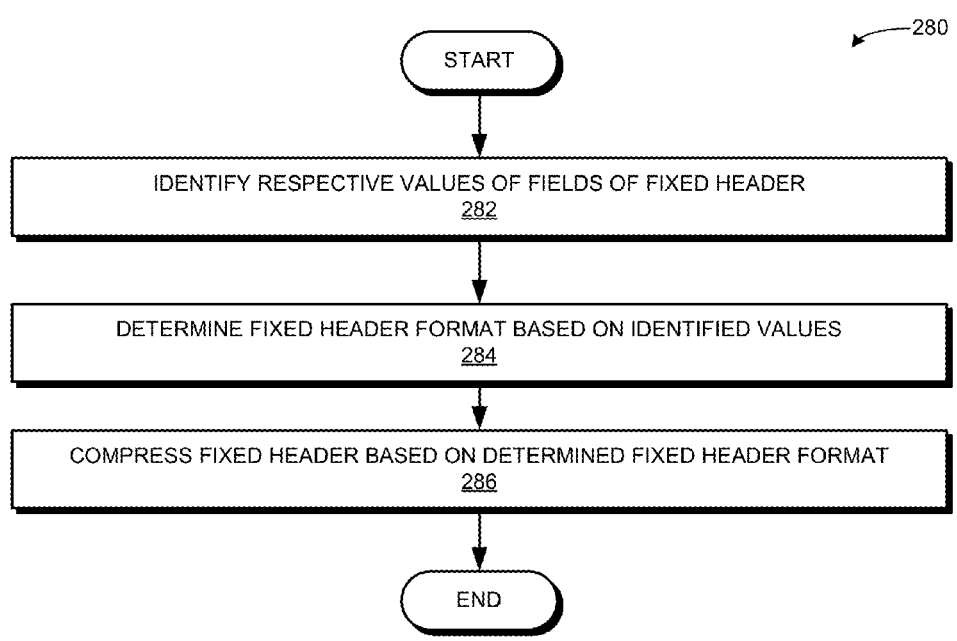
FIG. 2D presents a flow chart illustrating a method for compressing the fixed header of a CCN message, in accordance with an embodiment of the present invention.

FIG. 2D presents a flow chart 280 illustrating a method for compressing the fixed header of a CCN message, in accordance with an embodiment of the present invention. During operation, a header compression system of a CCN node identifies respective values of the fields of a fixed header of the message (operation 282) and determines a fixed header format based on the identified values (operation 284), as described in conjunction with FIG. 2C. The system then compresses the fixed header based on the determined fixed header format (operation 286).

TL Compression Using a Static Dictionary

Figure 3A:
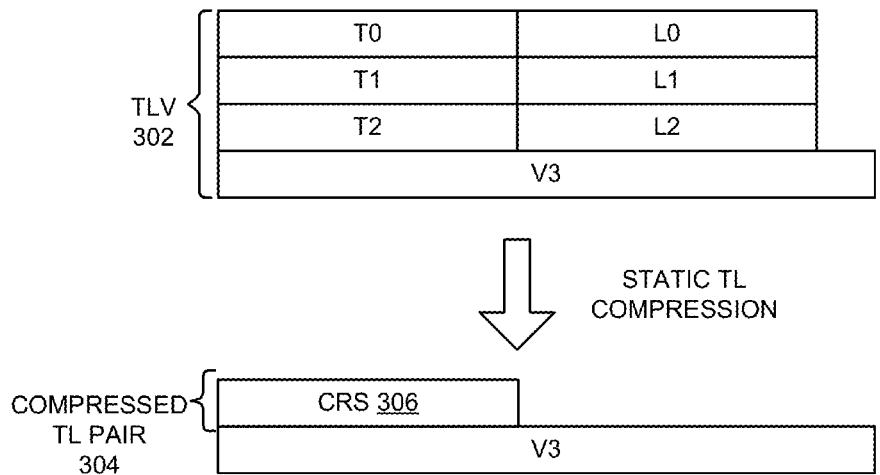
FIG. 3A illustrates an exemplary compression of type and length (TL) pair(s) of the header of a CCN message based on a static dictionary lookup, in accordance with an embodiment of the present invention.

FIG. 3A illustrates an exemplary compression of TL pair(s) of the header of a CCN message based on a static dictionary lookup, in accordance with an embodiment of the present invention. In this example, the optional header of the message includes a TLV 302, which includes a value V3, preceded by a set of contiguous TL pairs (T0, L0), (T1, L1), and (T2, L2) without any intermediate value. For example, the contiguous TL pairs can represent a validation type, a hash value (e.g., (Secure Hash Algorithm) SHA-256), and a key (e.g., a public key), and their respective lengths. Since each of these types and the corresponding lengths are fixed, contiguous TL pairs (T0, L0), (T1, L1), and (T2, L2) can be represented by a single compressed replacement string 306 in an entry in a static dictionary. The node can perform a lookup in the static dictionary, obtain string 306, and replace contiguous TL pairs (T0, L0), (T1, L1), and (T2, L2) as a compressed TL pair 304 in the header of the message. Here, the compression begins at a "type" (e.g., T0) and ends before a "value" (e.g., V3).

A static dictionary can be constructed using known TL pair strings based on an analysis of the domain knowledge (e.g., frequency analysis). A static dictionary can also be constructed for specific cases. For example, a static dictionary can exist for most commonly used TL pairs for a client. The node can include a plurality of static dictionaries and the context identifier can indicate which static dictionary has been used for compression. Before the node can start using a static dictionary, a respective other node in the network should also store a copy of the static dictionary. In some embodiments, a static dictionary is propagated to a respective node of the network.

Figure 3B:
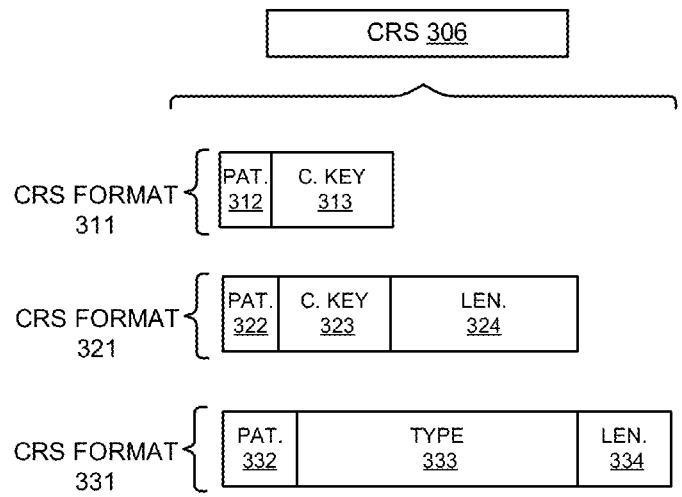
FIG. 3B illustrates exemplary compressed replacement string formats for compressing TL pair(s) of the header of a CCN message, in accordance with an embodiment of the present invention.

FIG. 3B illustrates exemplary compressed replacement string formats for compressing TL pair(s) of the header of a CCN message, in accordance with an embodiment of the present invention. In this example, compressed replacement string 306 can be represented in format 311, 321, or 331. Each of these formats can be byte-aligned for efficient processing. Format 311 includes a pattern 312 (e.g., "10") identifying format 311 and a compressor key 313. This compressor key 313 can represent the single or contiguous TL pair(s) in a compressed header. A compressor key is mapped to the corresponding TL pair(s) in the static dictionary. The number of bits to represent compressor key 313 can vary and pattern 312 indicates the number of bits allocated for compressor key 313. Format 311 is suitable if the TL pair(s) have a fixed length and does not need bits to represent it.

On the other hand, format 321 includes a pattern 322 (e.g., "0" or "110") identifying format 321, a compressor key 323, and a length 324. The number of bits to represent compressor key 323 and/or length 324 can vary, and pattern 322 indicates the number of bits allocated for compressor key 323 and length 324. Compressor key 323 can represent the single or contiguous TL pair(s) and length 324 can represent a length of the TL pair(s). Format 321 is suitable if the TL pair(s) can be replaced with a compressed replacement string and whose length can be represented by the bits in length 324. Here, both formats 311 and 321 can encode a dictionary hit (i.e., a successful lookup in a static dictionary).

However, if a dictionary miss occurs, the node can still compact the TL pair(s) by using fewer bits to represent the type(s) and length(s). Format 331 represents the compacted TL pair(s). Format 331 includes a pattern 332 (e.g., "1110,"

"111110," or "1111111") identifying format 331, a type 333, and a length 334. Number of bits to represent type 333 and/or length 334 can vary, and pattern 332 indicates the number of bits allocated for type 333 and length 334. For most of the TL pairs, the format 331 can be shorter than the length of a TL pair. In other words, format 331 can use fewer bytes to represent type 333 and/or length 334, thereby compacting the TL pair.

Figure 3C:
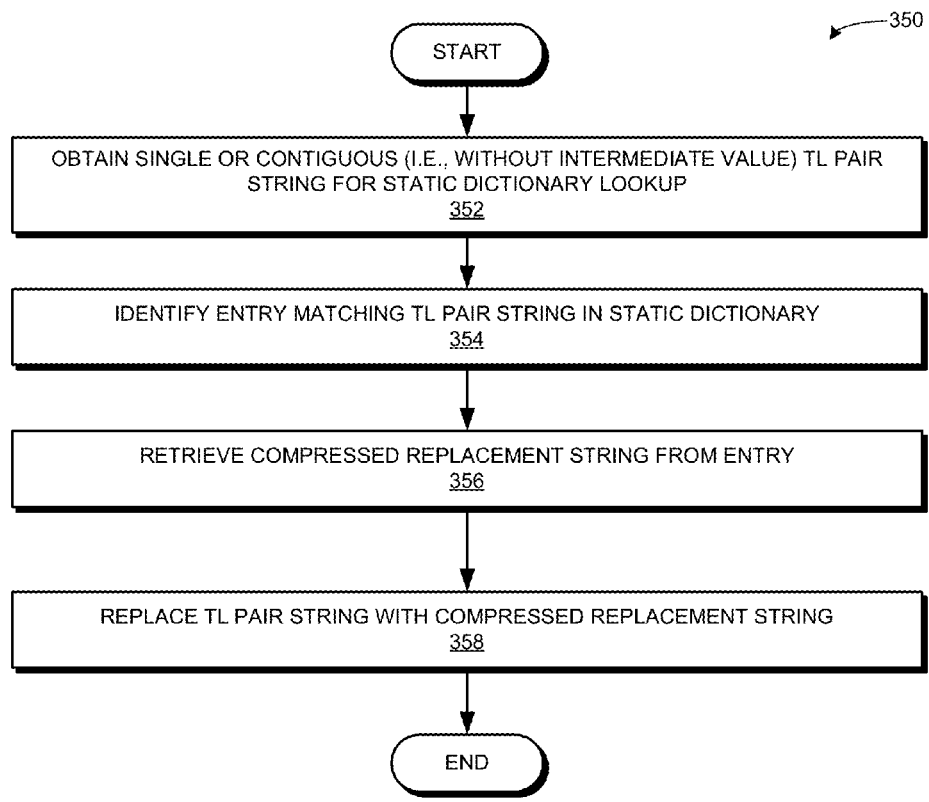
FIG. 3C presents a flow chart illustrating a method for compressing TL pair(s) of the header of a CCN message based on a static dictionary lookup, in accordance with an embodiment of the present invention.

FIG. 3C presents a flow chart 350 illustrating a method for compressing TL pair(s) of the header of a CCN message based on a static dictionary lookup, in accordance with an embodiment of the present invention. During operation, a header compression system of a CCN node obtains a single or contiguous (i.e., without an intermediate value) TL pair string in the optional header of the message for a static dictionary lookup (operation 352). The system identifies an entry matching the token in the static dictionary (operation 354). The system then retrieves the compressed replacement string from the entry (operation 356) and replaces the TL pair string in the optional header and message body with the compressed replacement string (operation 358).

TLV Compression Using a Learned Dictionary

Figure 4A:
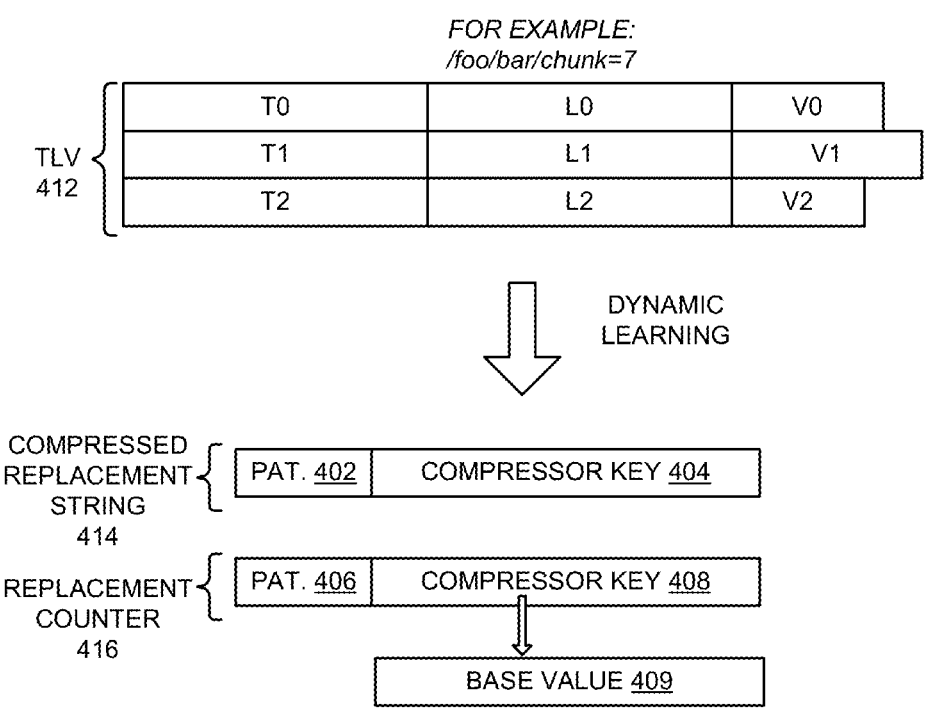
FIG. 4A illustrates an exemplary compression of type, length, and value(s) (TLVs) of the header of a CCN message based on a learned dictionary lookup, in accordance with an embodiment of the present invention.

FIG. 4A illustrates an exemplary compression of TLVs of the header of a CCN message based on a learned dictionary lookup, in accordance with an embodiment of the present invention. In this example, the optional header of the message includes TLV 412, which includes a set of TLVs (T0, L0, V0), (T1, L1, V1), and (T2, L2, V2). If a TLV represents a token, the node learns the TLV string, creates a compressed replacement string 414, and creates an entry in a learned dictionary with compressed replacement string 414. On the other hand, if a TLV represents a counter, the node learns the TLV string, determines a replacement counter 416 comprising a compressor key 408, which encodes the type of the TLV and a base value 409 for an offset. The node creates an entry in the learned dictionary with replacement counter 416. Compressed replacement string 414 and replacement counter 416 can be byte-aligned for efficient processing. Here, the compression begins at a "type" (e.g., T0) and ends with a "value" (e.g., V2).

The node then shares the entries with a peer node. The node can send a separate exchange message (e.g., with the packet type of the fixed header indicating "Dictionary"). An exchange message can carry one or more dictionary entries (i.e., dictionary definitions) for both token and counter TLVs. The node can also send the dictionary entry using in-band exchange (e.g., piggyback in a data message). To facilitate streaming, the learned value is sent un-coded. The in-band exchange can have its own CRC, and use a reverse offset and length in the footer of the message to point to the dictionary information in the packet.

When the peer node receives the dictionary entries, the peer node sends an acknowledge back to the node. In some embodiments, the acknowledgement is based on the entries based on a static dictionary for efficient exchange of information. A respective node can maintain a timer for a respective entry in the learned (and static) dictionary. If an entry is not used for a period of time, the node times out the entry and removes it from the dictionary. Upon receiving the acknowledgement, the node replaces the token TLV string with compressed replacement string 414 in the header of any subsequent message. On the other hand, if the header of the message includes the counter TLV, the node obtains the current value from the counter TLV and computes an offset based on the current value and base value 409. The node then replaces the counter TLV string with replacement counter 416 followed by the offset.

For example, the TLVs can represent a name "/foo/bar/chunk=7." Here, (T0, L0, V0) corresponds to a name type, the length of name component "foo," and the string "foo," respectively. Similarly, (T1, L1, V1) represents name component "bar" and (T2, L2, V2) represents name component "chunk=7." A file can be subdivided into a plurality of chunks and "chunk=7" can represent the 8th chunk of the file. Since (T0, L0, V0) and (T1, L1, V1) is repeated for a respective chunk, the node can compress the TLV string representing (T0, L0, V0) and (T1, L1, V1) together with compressed replacement string 414. On the other hand, since (T2, L2, V2) represents a counter, the node can compress (T2, L2 V2) by replacing (T2, L2, V2) with replacement counter 416 followed by the offset (e.g., V2-base value 409).

When a peer node receives a message with a compressed optional header and message body, the peer node applies a reverse matching to the learned dictionary to obtain the token TLV string. In the same way, the peer node can obtain the base value for the counter TLV string. The peer node then uses the base value and the offset to calculate the value. It should be noted that the compression and decompression can be between two peer nodes, or the endpoints of a communication (e.g., generator and consumer of an interest).

If base value 409 needs to be changed (e.g., to accommodate a larger counter value), the node updates base value 409 in the entry with replacement counter 416 and sends the updated entry to the peer node. The node can use an exchange message or in-band exchange to send the updated entry. In some embodiments, the node can generate a plurality of replacement counters with different compressor keys for a counter TLV string in the learned dictionary. These replacement counters correspond to different base values, each representing a base for a range of counter values. The node shares these replacement counters with the peer node. When a larger counter value is needed, the node simply uses the base value for the next range of counter value. In this way, the node can avoid waiting for an exchange acknowledgement from a peer node.

In this example, compressed replacement string 414 includes a pattern 402 (e.g., "11110," "1111110," or "11111110") and a compressor key 404. Number of bits to represent (i.e., the length of) compressor key 404 can vary and pattern 402 indicates the number of bits allocated for compressor key 404. The length of compressor key 404 (and hence, compressed replacement string 414) can be proportional to the length of the TLV string in the entry of the learned dictionary. For example, if the TLV string is a name segment, a key identifier, or a public key, the length of compressed replacement string 414 can be 2, 3, or 4 bytes, respectively. Similarly, replacement counter 416 includes a pattern 406, which indicates the number of bits allocated for compressor key 408. To calculate an offset efficiently, a calculated offset can have a prefix (e.g., "0," "10," "110," "1110," and "11110") representing a range of offset. The offset then only uses the bits needed to indicate a value within that range, thereby achieving further compression.

Figure 4B:
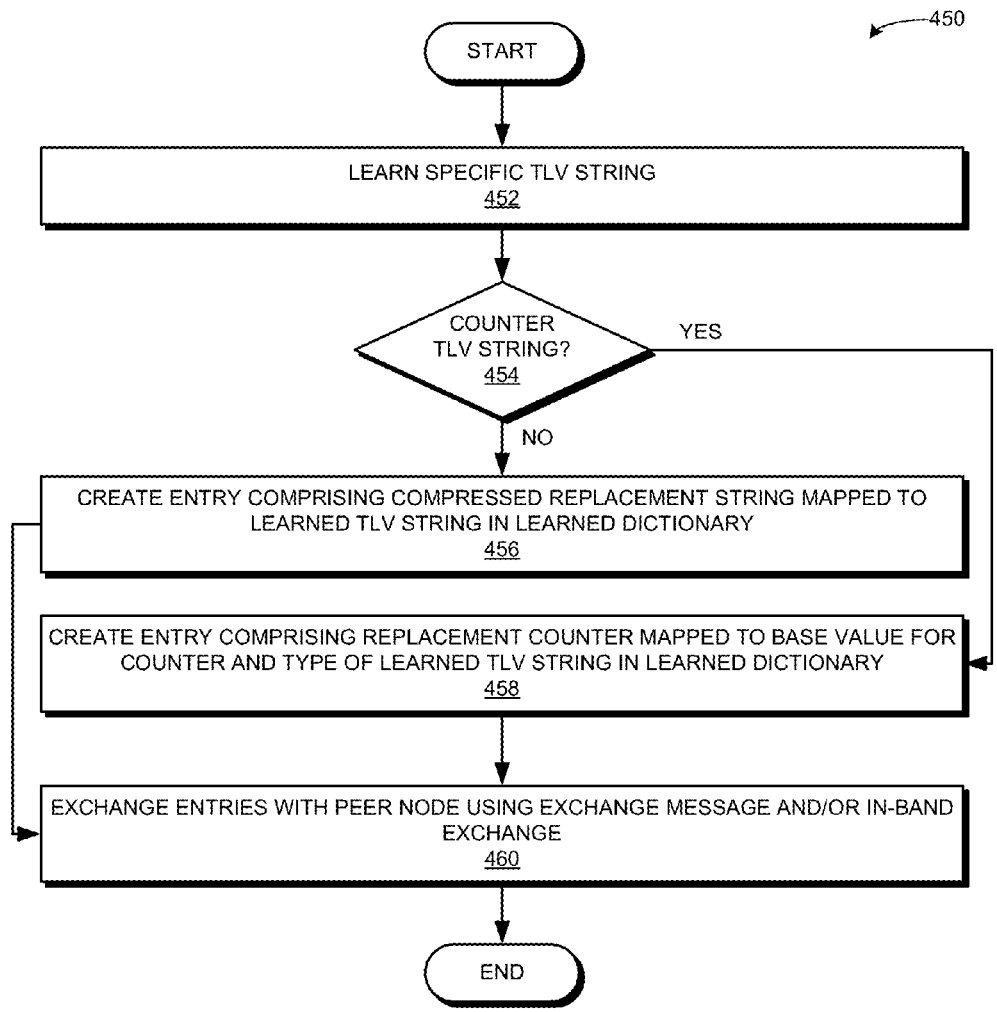
FIG. 4B presents a flow chart illustrating a method for learning TLV string(s) for creating a learned dictionary entry, in accordance with an embodiment of the present invention.

FIG. 4B presents a flow chart 450 illustrating a method for learning TLV string(s) for creating a learned dictionary entry, in accordance with an embodiment of the present invention. During operation, a header compression system of a CCN node learns a specific TLV string from the header of a message (operation 452). The system then checks whether the learned TLV string is a counter TLV string (operation 454), as described in conjunction with FIG. 4A. If not, the system creates an entry comprising a compressed replacement string mapped to the learned TLV string in the learned dictionary (operation 456). Otherwise, the system creates an entry comprising a replacement counter mapped to a base value for the counter and the type of the learned TLV string in the learned dictionary (operation 458). The system then exchanges the entries with a peer node using an exchange message and/or an in-band exchange (operation 460).

Figure 4C:
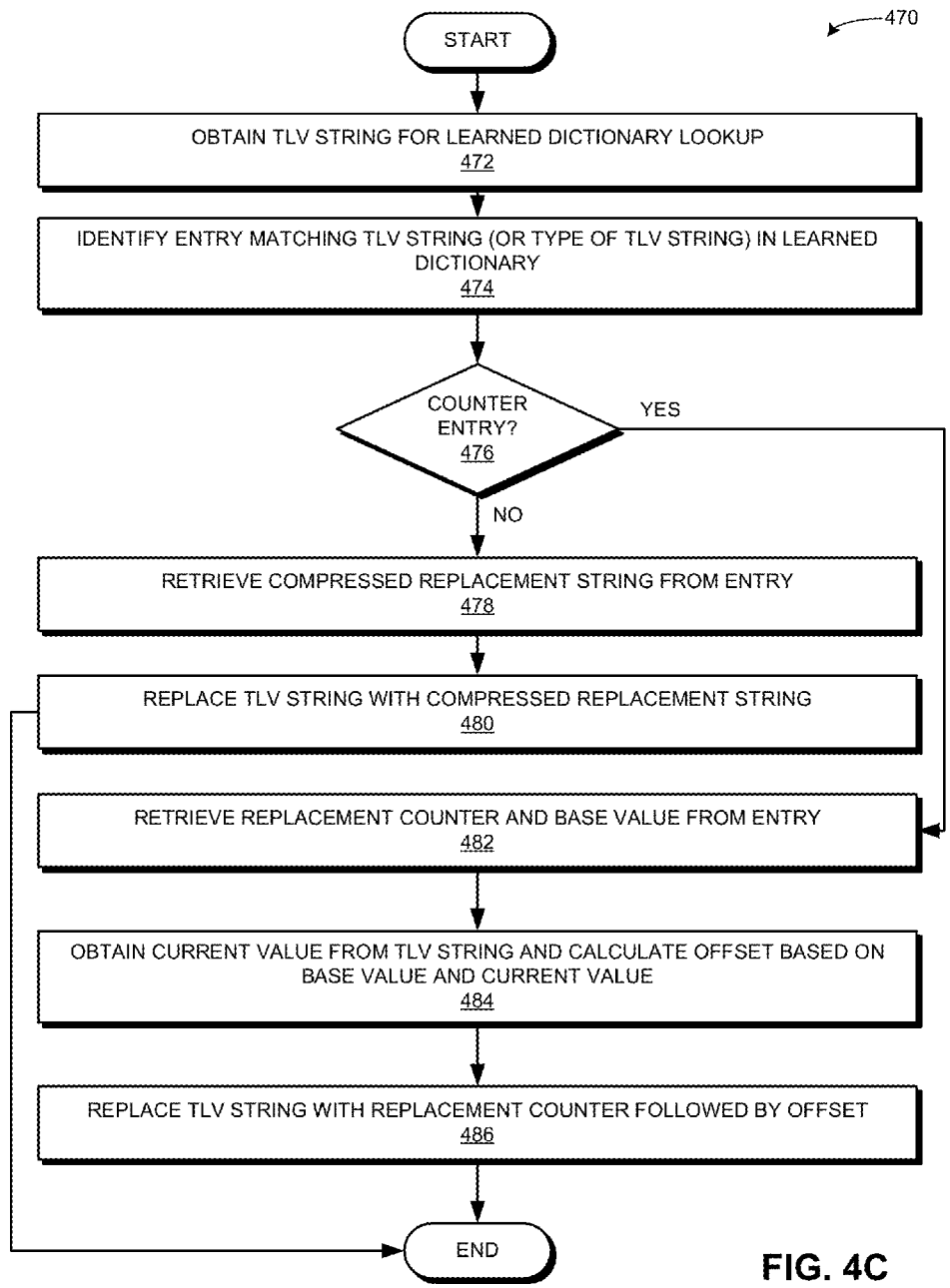
FIG. 4C presents a flow chart illustrating a method for compressing a TLV string of the header of a CCN message based on a learned dictionary lookup, in accordance with an embodiment of the present invention.

FIG. 4C presents a flow chart 470 illustrating a method for compressing a TLV string of the header of a CCN message based on a learned dictionary lookup, in accordance with an embodiment of the present invention. During operation, a header compression system of a CCN node obtains a TLV string for a learned dictionary lookup (operation 472) and identifies an entry matching the TLV string (or the type of the TLV string) in the learned dictionary (operation 474). The system then checks whether the entry is a counter entry (operation 476).

If not, the system retrieves the compressed replacement string from the entry (operation 478) and replaces the TLV string with the compressed replacement string (operation 480). Otherwise, the system retrieves a replacement counter and the base value for the counter from the entry (operation 482). The system then obtains a current value from the TLV string and calculates an offset based on the base value and the current value (operation 484). The system replaces the TLV string with the replacement counter followed by the offset (operation 486).

TL Compression Using an Encoded Dictionary

Figure 5A:
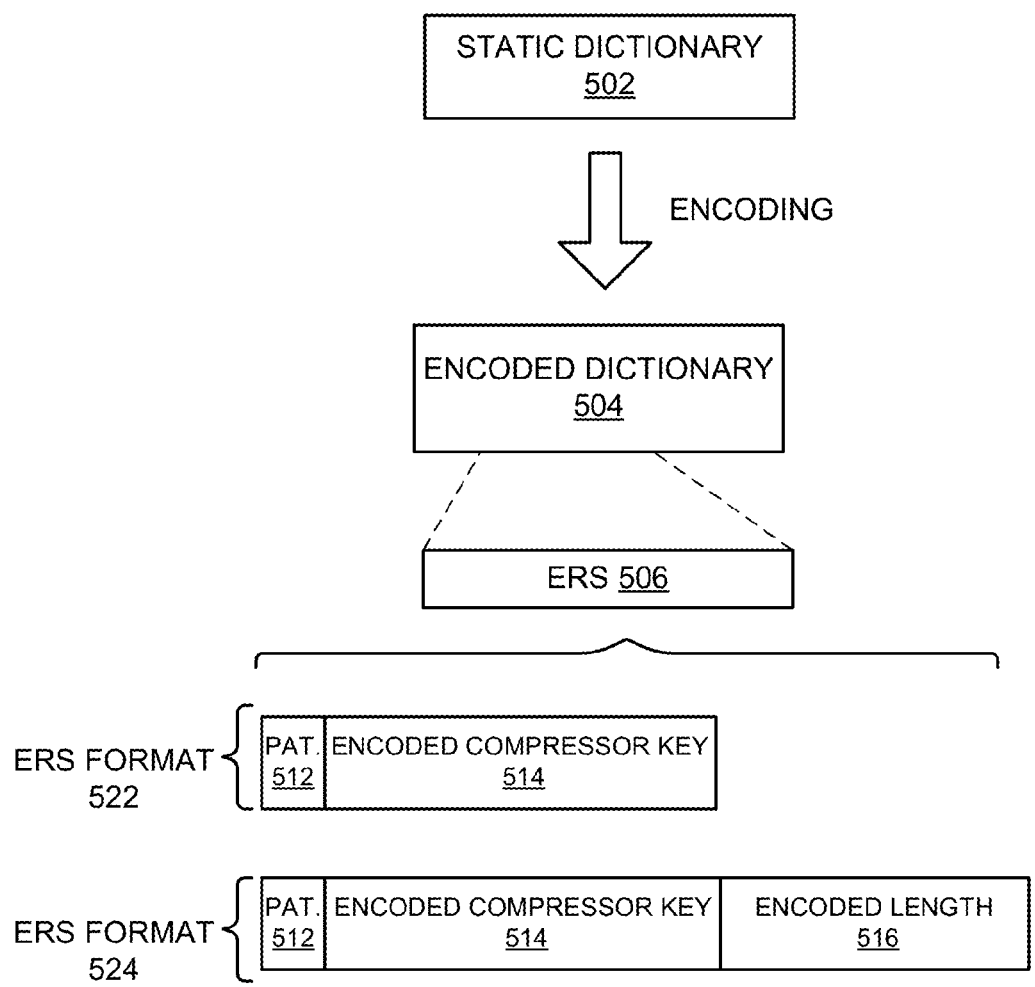
FIG. 5A illustrates exemplary formats for a bit-aligned encoded dictionary entry, in accordance with an embodiment of the present invention.

FIG. 5A illustrates exemplary formats for a bit-aligned encoded dictionary entry, in accordance with an embodiment of the present invention. In this example, a CCN node can apply an encoding to a static dictionary 502 to generate an encoded dictionary 504. In some embodiments, the encoding is Huffman encoding. As a result, an entry in encoded dictionary 504 can correspond to a leaf node of a Huffman tree representing the compressed replacement strings in static dictionary 502. By encoding a compressed replacement string, the node generates a corresponding encoded replacement string 506. Encoded replacement string 506 can represent a fixed TL pair, contiguous TL pairs, a fixed type and a bit length, and a fixed type and an encoded length.

In this example, encoded replacement string 506 can be represented in format 522 or 524. Since encoded replacement string 506 can be generated based on Huffman encoding, these formats can be bit-aligned. Format 522 includes a pattern 512 (e.g., "0") indicating that an encoded dictionary should be used for decompressing. Format 522 also includes an encoded compressor key 514, which is a string from a Huffman tree. In format 524, encoded compressor key 514 precedes an encoded length field 516. Encoded length field 516 includes a prefix corresponding to a range of values. The rest of the bits are used to represent a value in that range. Compressing TL pair(s) using an encoded dictionary has been described in conjunction with FIG. 3C.

Figure 5B:
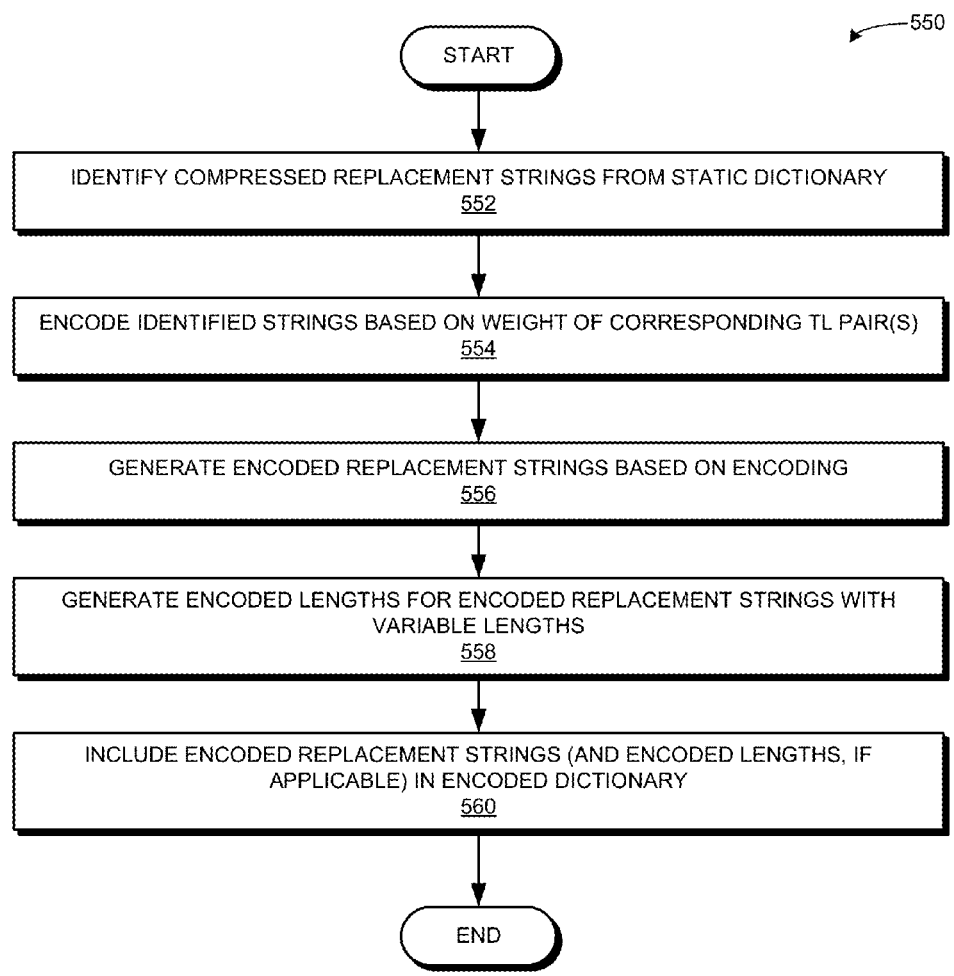
FIG. 5B presents a flow chart illustrating a method generating an encoded dictionary, in accordance with an embodiment of the present invention.

FIG. 5B presents a flow chart 550 illustrating a method generating an encoded dictionary, in accordance with an embodiment of the present invention. During operation, a header compression system of a CCN node identifies compressed replacement strings from a static dictionary (operation 552). The system encodes the identified strings based on the weights (e.g., the respective frequencies) of the corresponding TL pair(s) (operation 554). In some embodiments, this encoding is done based on Huffman encoding and the weight represents the frequency of appearance of the corresponding TL pair(s). The system generates encoded replacement strings based on the encoding (operation 556) and encoded lengths for encoded replacement strings with variable lengths (operation 558). The system then includes the encoded replacement strings (and their encoded lengths, if applicable) in the encoded dictionary (operation 560).

Exemplary Computer and Communication System

Figure 6:
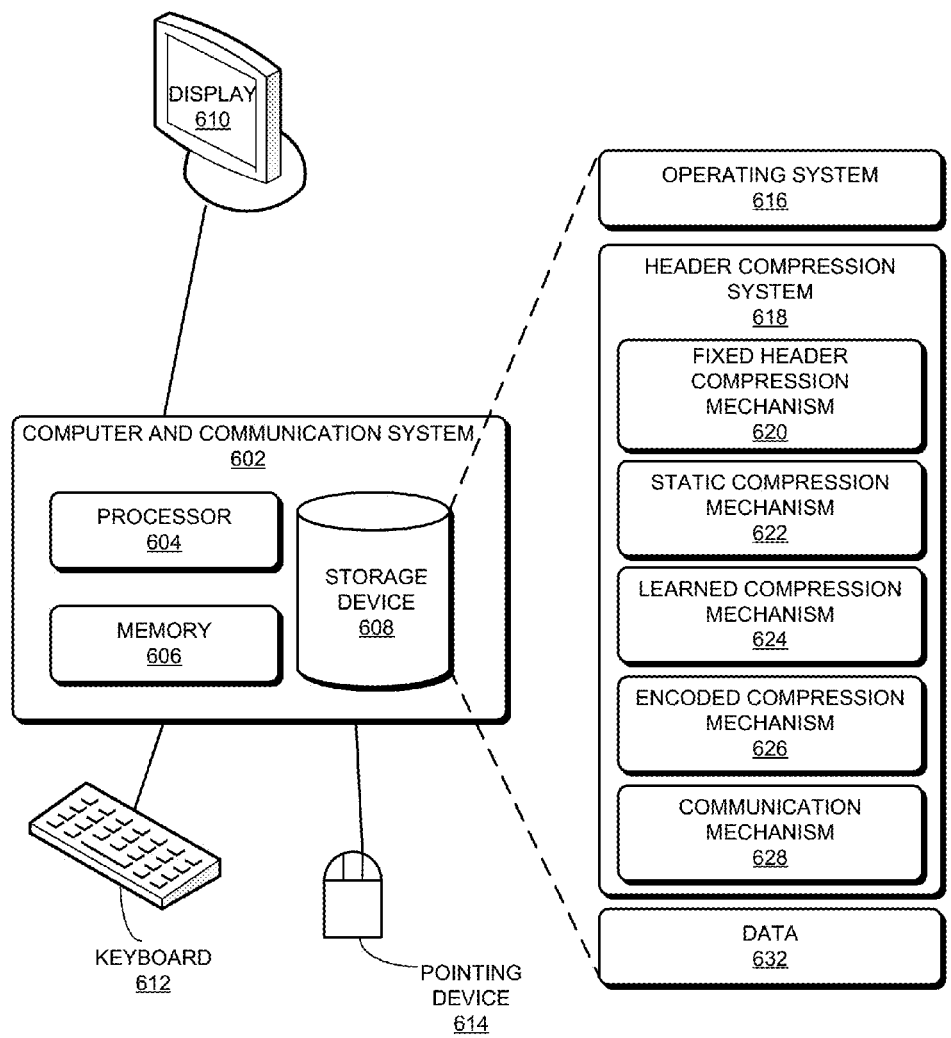
FIG. 6 illustrates an exemplary computer and communication system that facilitates header compression for CCN messages, in accordance with an embodiment of the present invention.

FIG. 6 illustrates an exemplary computer and communication system that facilitates header compression for CCN messages, in accordance with an embodiment of the present invention. A computer and communication system 602 includes a processor 604, a memory 606, and a storage device 608. Memory 606 can include a volatile memory (e.g., RAM) that serves as a managed memory, and can be used to store one or more memory pools. Furthermore, computer and communication system 602 can be coupled to a display device 610, a keyboard 612, and a pointing device 614. Storage device 608 can store an operating system 616, a header compression system 618, and data 632.

Header compression system 618 can include instructions, which when executed by computer and communication system 602, can cause computer and communication system 802 to perform methods and/or processes described in this disclosure. Specifically, header compression system 618 may include instructions for receiving a packet that corresponds to a content-centric network (CCN) message, where a name for the CCN message is a hierarchically structured variable-length identifier (HSVLI) which comprises contiguous name components ordered from a most general level to a most specific level (communication mechanism 628).

Header compression system 618 can further include instructions for compressing fixed headers of a CCN message (fixed header compression mechanism 620). Header compression system 618 can also include instructions for compressing (and decompressing) single or contiguous TL pair(s) based on a static dictionary (static compression mechanism 622). Header compression system 618 can include instructions for learning TLV strings in a learned dictionary and compressing (and decompressing) the TLV strings based on the learned dictionary (learned compression mechanism 624). Header compression system 618 can also include instructions for exchanging the learned dictionary with peer nodes (communication mechanism 628). Furthermore, header compression system 618 can include instructions learning for encoding the static dictionary to create an encoded dictionary and compressing (and decompressing) single or contiguous TL pair(s) using the encoded dictionary (encoded compression mechanism 626). The dictionaries can be stored in memory 606 and/or storage device 608.

Data 632 can include any data that is required as input or that is generated as output by the methods and/or processes described in this disclosure. Specifically, data 632 can store at least: a packet that corresponds to a content-centric network (CCN) message; a name for the CCN message that is a hierarchically structured variable length identifier (HSVLI) which comprises contiguous name components ordered from a most general level to a most specific level; a CCN message that is an interest message; a packet that corresponds to an interest return message; an indication of an error condition corresponding to no available forwarding route corresponding to the name of the CCN message or interest message.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for efficient packet forwarding, the method comprising:
   generating a compressed representation of a type, length, and value (TLV) string in response to identifying the TLV string in a packet;
   storing the compressed representation for the TLV string in an entry of a learned dictionary in a storage device of a first node, wherein the compressed representation in the entry is a compressed counter comprising a compressor key, and wherein the compressor key is mapped to a type of the TLV string and a base value in the entry;
   sending from the first node the entry to a second node;
   receiving, by the first node, an acknowledgement from the second node; and
   in response to identifying the TLV string in a subsequent second packet of the acknowledgement, compressing the TLV string in the second packet based on the compressed representation, wherein compressing the TLV string in the second packet further comprises:
   calculating an offset based on a value in the TLV string and the base value; and
   replacing the TLV string with the compressor key and the offset.

2. The method of claim 1, wherein the compressed representation in the entry is a compressed replacement string, wherein the compressed replacement string is mapped to the TLV string in the entry; and
   wherein compressing the TLV string in the second packet further comprises replacing the TLV string with the compressed replacement string.

3. The method of claim 2, wherein a length of the compressed replacement string is proportional to a length of the TLV string in the entry.

4. The method of claim 1, wherein the packet is a content-centric network (CCN) message, and wherein a name for the CCN message is a hierarchically structured variable length identifier (HSVLI), which comprises contiguous name components ordered from a most general level to a most specific level;
   wherein the method further comprises replacing a fixed header of the CCN message with a compressed fixed header.

5. The method of claim 4, wherein the TLV string is one of:
   a Key Identifier;
   a Public Key;
   a Certificate; and
   a Name Prefix.

6. The method of claim 1, wherein the first and second nodes store a static dictionary, wherein the static dictionary maps a type and length (TL) string to a compressed replacement TL string, and wherein the acknowledgement from the second node includes one or more compressed replacement TL strings compressed based on the static dictionary.

7. The method of claim 1, wherein the entry is timed out in response to inactivity over a period of time.

8. The method of claim 1, wherein the TLV string in the packet is a concatenation of a plurality of TLV strings.

9. A computer system for facilitating forwarding of packets, the system comprising:
   a processor; and
   a storage device storing instructions that when executed by the processor cause the processor to perform a method, the method comprising:
   generating a compressed representation of a type, length, and value (TLV) string in response to identifying the TLV string in a packet;
   storing the compressed representation for the TLV string in an entry of a learned dictionary in a storage device of a first node, wherein the compressed representation in the entry is a compressed counter comprising a compressor key, and wherein the compressor key is mapped to a type of the TLV string and a base value in the entry;
   sending from the first node the entry to a second node;
   receiving, by the first node, an acknowledgement from the second node; and
   in response to identifying the TLV string in a subsequent second packet of the acknowledgement, compressing the TLV string in the second packet based on the compressed representation, wherein compressing the TLV string in the second packet further comprises:
   calculating an offset based on a value in the TLV string and the base value; and
   replacing the TLV string with the compressor key and the offset.

10. The computer system of claim 9, wherein the compressed representation in the entry is a compressed replacement string, wherein the compressed replacement string is mapped to the TLV string in the entry; and
    wherein compressing the TLV string in the second packet further comprises replacing the TLV string with the compressed replacement string.

11. The computer system of claim 10, wherein a length of the compressed replacement string is proportional to a length of the TLV string in the entry.

12. The computer system of claim 9, wherein the packet is a content centric network (CCN) message, and wherein a name for the CCN message is a hierarchically structured variable length identifier (HSVLI) which comprises contiguous name components ordered from a most general level to a most specific level;

wherein the method further comprises replacing a fixed header of the CCN message with a compressed fixed header.

13. The computer system of claim 12, wherein the TLV string is one of:
a Key Identifier;
a Public Key;
a Certificate; and
a Name Prefix.

14. The computer system of claim 9, wherein the first and second nodes store a static dictionary, wherein the static dictionary maps a type and length (TL) string to a compressed replacement TL string, and wherein the acknowledgement from the second node includes one or more compressed replacement TL strings compressed based on the static dictionary.

15. The computer system of claim 9, wherein the entry is timed out in response to inactivity over a period of time.

16. The computer system of claim 9, wherein the TLV string in the packet is a concatenation of a plurality of TLV strings.

17. A non-transitory computer-readable storage medium storing instructions that when executed by a computer cause the computer to perform a method, the method comprising:
generating a compressed representation of a type, length, and value (TLV) string in response to identifying the TLV string in a packet;
storing the compressed representation for the TLV string in an entry of a learned dictionary in a storage device of a first node, wherein the compressed representation in the entry is a compressed counter comprising a compressor key, and wherein the compressor key is mapped to a type of the TLV string and a base value in the entry;
sending from the first node the entry to a second node;

receiving, by the first node, an acknowledgement from the second node; and
in response to identifying the TLV string in a subsequent second packet of the acknowledgement, compressing the TLV string in the second packet based on the compressed representation, wherein compressing the TLV string in the second packet further comprises:
calculating an offset based on a value in the TLV string and the base value; and
replacing the TLV string with the compressor key and the offset.

18. The non-transitory computer-readable storage medium of claim 17, wherein the packet is a content-centric network (CCN) message, and wherein a name for the CCN message is a hierarchically structured variable length identifier (HSVLI) which comprises contiguous name components ordered from a most general level to a most specific level;
wherein the method further comprises replacing a fixed header of the CCN message with a compressed fixed header.

19. The non-transitory computer-readable storage medium of claim 17, wherein the compressed representation in the entry is a compressed replacement string, wherein the compressed replacement string is mapped to the TLV string in the entry; and
wherein compressing the TLV string in the second packet further comprises replacing the TLV string with the compressed replacement string.

20. The non-transitory computer-readable storage medium of claim 19, wherein a length of the compressed replacement string is proportional to a length of the TLV string in the entry.

* * * * *